United States Patent
Seshachalam et al.

(10) Patent No.: US 9,169,863 B2
(45) Date of Patent: Oct. 27, 2015

(54) LATCHING APPARATUS FOR SEQUENTIALLY LATCHING AND UNLATCHING OBJECT

(71) Applicant: Caterpillar Inc., Peoria, IL (US)

(72) Inventors: Rajarajan Seshachalam, Chennai (IN); Srinivasan Govindaraj, Chennai (IN)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/288,827

(22) Filed: May 28, 2014

(65) Prior Publication Data

US 2014/0353994 A1    Dec. 4, 2014

(30) Foreign Application Priority Data

Jun. 4, 2013  (IN) .......................... 1676/DEL/2013

(51) Int. Cl.
*B66C 1/42* (2006.01)
*F16B 21/06* (2006.01)

(52) U.S. Cl.
CPC ................. *F16B 21/06* (2013.01); *B66C 1/422* (2013.01); *Y10T 403/602* (2015.01)

(58) Field of Classification Search
CPC .......... B66C 1/44; B66C 1/422; B66C 1/442; F16B 21/02; F16B 21/06; Y10T 403/602; Y10T 403/604
USPC ................................. 294/110.2, 67.32, 81.53
See application file for complete search history.

(56) References Cited

U.S. PATENT DOCUMENTS

| | | | | |
|---|---|---|---|---|
| 1,673,237 A | * | 6/1928 | Gerdes | 294/110.1 |
| 2,382,227 A | * | 8/1945 | Hopkins et al. | 294/110.1 |
| 2,874,990 A | * | 2/1959 | Janoff | 294/119.1 |
| 2,890,906 A | * | 6/1959 | Jacquart | 294/119.1 |
| 3,286,316 A | | 11/1966 | Marosy | |
| 3,455,593 A | * | 7/1969 | Moro | 294/110.1 |
| 4,666,200 A | * | 5/1987 | Walker et al. | 294/110.2 |
| 6,322,120 B1 | * | 11/2001 | Carey | 294/110.2 |
| 6,883,211 B2 | | 4/2005 | Hoshino | |
| 8,348,319 B2 | | 1/2013 | LaValley et al. | |

FOREIGN PATENT DOCUMENTS

CN    2921475 Y    7/2007

* cited by examiner

*Primary Examiner* — Dean Kramer

(57) ABSTRACT

A latching apparatus for sequentially latching and unlatching two objects is provided. The latching apparatus includes a cylinder attached to the first object and including a first opening, and a second opening laterally disposed to the first opening, a spring loaded piston including a circumferential wall disposed in the first opening, a shank axially extending from the piston and defining a transverse latch pin at an end thereof, and a spring loaded plunger disposed within the second opening. The wall defines a contiguous cam-groove thereon. The cam-groove includes alternating upper and lower nodal points with straight and inclined segments therebetween. The plunger slidably engages the cam-groove to co-operatively execute one or more of a translation, and a rotation of the shank such that the latch pin rotatably extends or retracts into or out of the slotted opening on the locking plate of the second object.

20 Claims, 13 Drawing Sheets

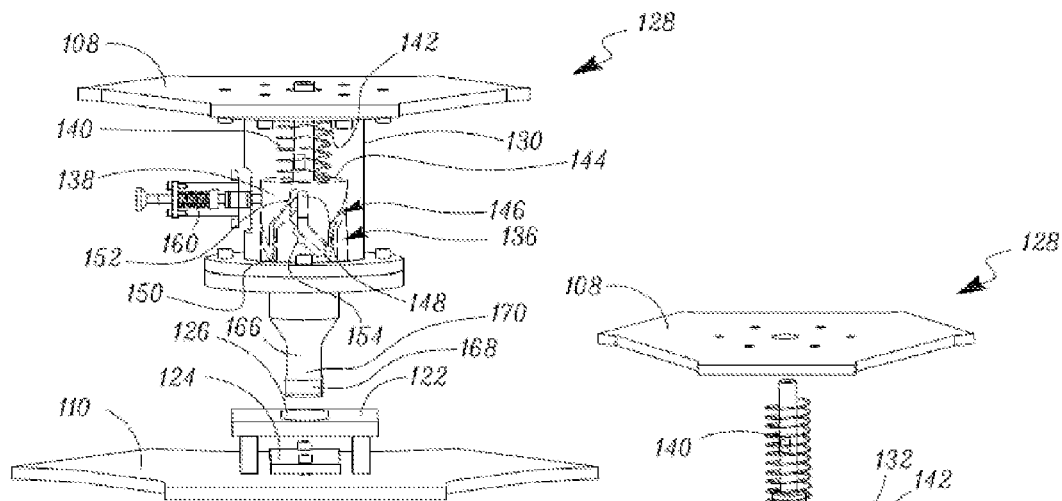
FIG. 2
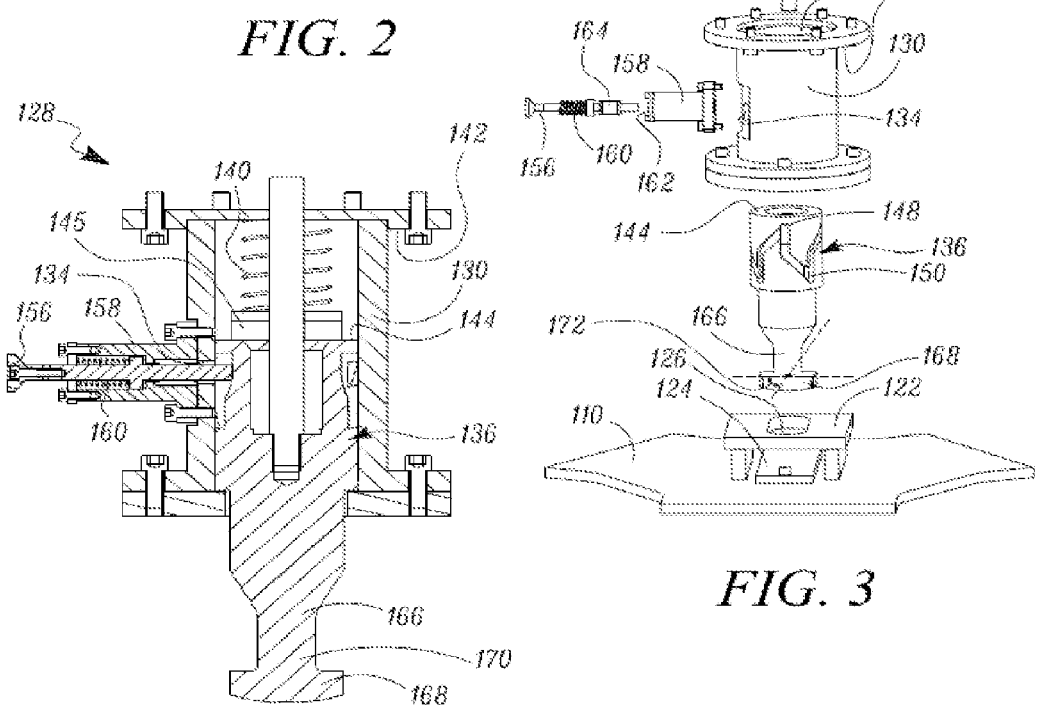
FIG. 3
FIG. 4

LATCHING APPARATUS FOR SEQUENTIALLY LATCHING AND UNLATCHING OBJECT

CROSS-REFERENCE TO RELATED APPLICATION

The present application claims the benefit of Indian Patent Application No. 1676/DEL/2013, filed Jun. 4, 2013, which is incorporated herein by reference.

TECHNICAL FIELD

The present disclosure relates to a latching apparatus, and more particularly to a latching apparatus for sequentially latching and unlatching two objects, such as, e.g., a head portion and a base portion of a grabber to releasably maintain arms thereof in a steady spread state or a steady closed state.

BACKGROUND

Many large industrial manufacturers use mechanical grapples or grabbers to hoist and transport an object of manufacture from one location to another. Typically, these scenarios may be encountered in a shop floor having assembly lines. Previously known grabbers required operating personnel to adjust arms of the grabbers such that the arms surrounded the object prior to hoisting the object. Further, in order to release and position the object at a required location, the arms of the grabber would have to be spread wide open by the operating personnel. Therefore, the activity of adjusting arms of the grabber may be repetitive each time the grabber is used in hoisting and transporting objects to a new location. Repetitive adjustment to the arms for sequentially grabbing and releasing the object entails manual effort and hence, is labor intensive.

Many conventional grabbers employ hydraulic or electro-hydraulic systems to automate the opening and closing of the arms and overcome the manual intervention in positioning the arms, for example, U.S. Pat. No. 8,348,319 ('319 patent) relates to a grapple attachment for use with a drill pipe. The grapple attachment disclosed in the '319 patent includes hydraulic pistons to actuate claws between an open position and a closed position. However, these hydraulic or electrohydraulic systems may be expensive and may be subject to frequent maintenance especially if the grabber is used frequently. Thus, a cost-effective system, devoid of manual intervention, is required to adjust and maintain the arms sequentially between the grabbing and releasing positions so that the grabber may hoist and transport the objects from one location to another.

SUMMARY OF THE DISCLOSURE

In one aspect, the present disclosure provides a latching apparatus for sequentially latching and unlatching two objects wherein at least one of the objects includes a locking plate and a slotted opening thereon. The latching apparatus includes a cylinder, a spring loaded piston, a shank, and a spring loaded plunger. The cylinder is attached to the first object. The cylinder includes a first opening, and a second opening laterally disposed to the first opening. The spring loaded piston includes a circumferential wall disposed in the first opening. The wall defines a contiguous cam-groove thereon. The cam-groove includes alternating upper and lower nodal points with upright and inclined segments therebetween. The shank axially extends from the piston and defines a transverse latch pin at an end thereof. The spring loaded plunger is disposed within the second opening to slidably engage the cam-groove. The plunger and the cam-groove are configured to co-operatively execute one or more of translation and rotation of the shank such that the latch pin rotatably extends or retracts into and out of the slotted opening on the locking plate of the second object.

In another aspect, the present disclosure discloses a coupler assembly for sequentially coupling and uncoupling an object to a hoisting device. The coupler includes a grabber, and a latching apparatus. The grabber is disposed between the hoisting device and the object. The grabber includes a head portion, two or more arms, and a base portion. The arms are pivotally connected to the head portion. The base portion includes links configured to control a radial spread or closure of the arms relative to the object. The latching apparatus is disposed between the head portion and the base portion of the grabber. The latching apparatus sequentially latches and unlatches the head portion to the base portion such that the arms are releasably maintained in a steady spread state or a steady closed state.

Other features and aspects of this disclosure will be apparent from the following description and the accompanying drawings.

BRIEF DESCRIPTION OF THE DRAWINGS

FIG. 2 is an front perspective view of a latching apparatus incorporated within and associated with the coupler assembly of FIG. 1;

FIG. 3 is an exploded view of the latching apparatus of FIG. 2;

FIG. 4 is a front sectional view of the latching apparatus of FIG. 2 with a locking plate removed;

DETAILED DESCRIPTION

The present disclosure relates to a grabber, which incorporates a latching apparatus for sequentially opening and closing arms of the grabber and releasably maintaining the arms in the opened and closed state. Although the description focuses on grabber assemblies, it can be appreciated that the apparatus and methods disclosed herein can be similarly applied to sequentially latch and unlatch other kinds of objects, for example, but not limited to a door and a frame.

Figure 1:
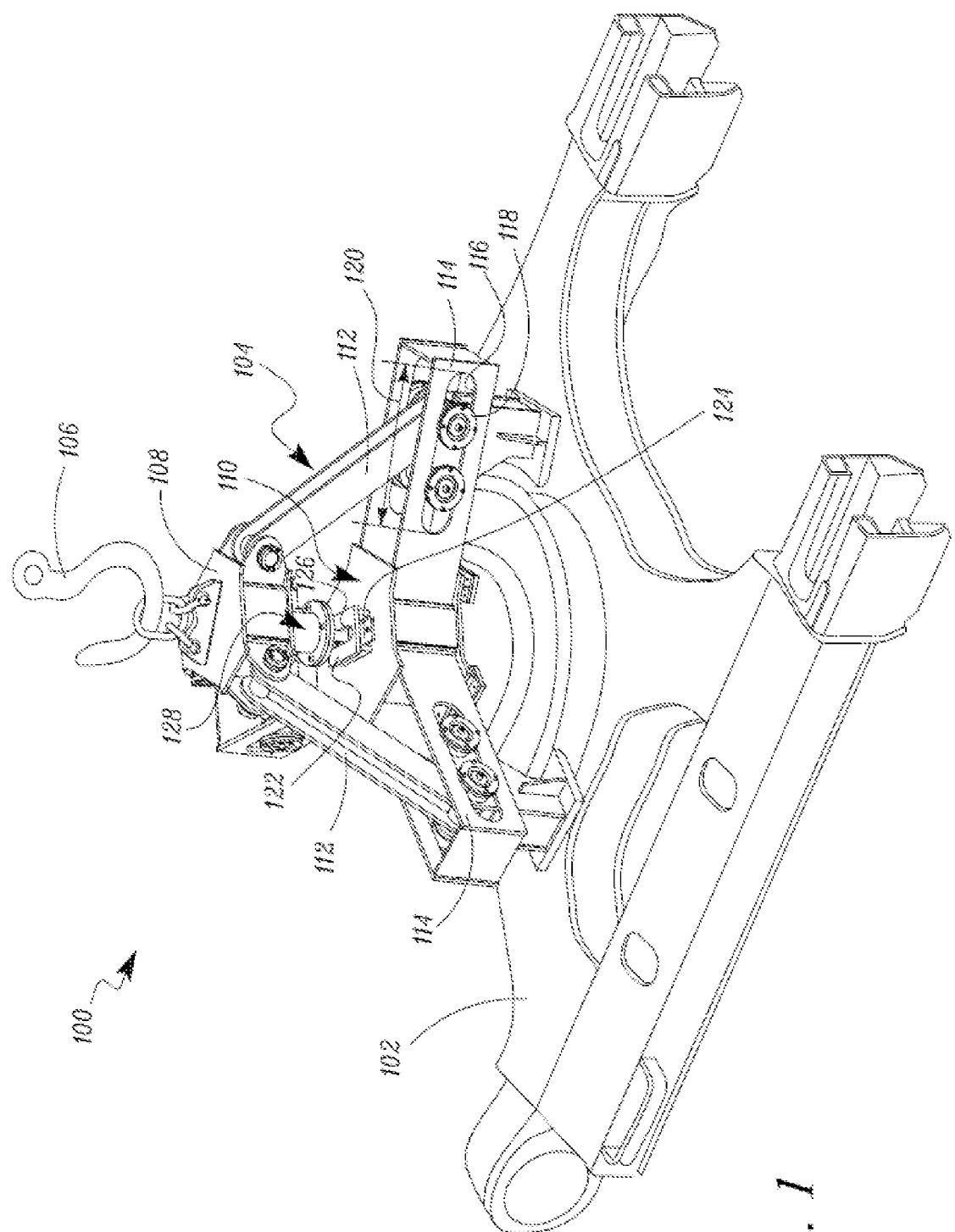
FIG. 1 is a front perspective view of a coupler assembly in accordance with an embodiment of the present disclosure shown clinching an object.

Referring to FIG. 1, a coupler assembly 100 is shown and may be used to hoist and transport an object 102 from one location to another, such as but not limited to, a chassis of a hydraulic excavator in an assembly line, for example. The coupler assembly 100 may be similarly used to hoist chassis or other large objects 102 typically used in work machines such as off-highway trucks, automobiles, and the like.

The coupler assembly 100 may be defined as a mechanical grapple or grabber 104. The coupler assembly 104 may be disposed between a hoisting device 106 and the object 102. The grabber 104 includes a head portion 108, a base portion 110, and three arms 112. However, it is envisioned that the grabber 104 disclosed herein could also function with two arms 112 or multiple arms 112 (e.g., more than one) as is illustrated. Each arm 112 has a bottom portion that is configured to engage a work-piece or the object 102 and a top portion that is pivotally connected to the head portion 108. The base portion 110 of the grabber 104 includes links 114 configured to control a radial spread or closure of the arms 112 relative to the object 102. The links 114 extend radially outwards and define one or more track guides 116 therein. The arms 112 of the grabber 104 include roller pins 118 slidably connected to the track guide 116 such that an extent of radial spread or closure of the arms 112 relative to the object 102 is controlled by a length 120 of the track guide 116. The base portion 110 further includes a locking plate 122, and a depressor plate 124. The locking plate 122 defines a slotted opening 126 thereon while the depressor plate 124 is spaced apart and disposed beneath the slotted opening 126.

The coupler assembly 100 further includes a latching apparatus 128 disposed between the head portion 108 and the base portion 110 of the grabber 104. The latching apparatus 128 is configured to sequentially latch and unlatch the head portion 108 to the base portion 110 such that the arms 112 are releasably maintained in a steady spread state or a steady closed state relative to the object 102. In an embodiment as shown in FIG. 2-4, the latching apparatus 128 includes a cylinder 130 attached to the head portion 108. The cylinder 130 includes a first opening 132, and a second opening 134 laterally disposed to the first opening 132. The latching apparatus 128 further includes a spring loaded piston 136 including a circumferential wall 138 disposed in the first opening 132. The latching apparatus 128 further includes a first compression spring 140 disposed between a head end 142 of the cylinder 130 and a head end 144 of the piston 136. The first compression spring 140 is configured to bias the piston 136 away from the head end 142 of the cylinder 130.

Referring to FIG. 4, the latching apparatus 128 may include a thrust bearing 145 disposed between the first compression spring 140 and the head end 144 of the piston 136. The first compression spring 140 is configured to sandwich the thrust bearing 145 between it and the piston 136 such that the first compression spring 140 is isolated from any torque transferred by the piston 136 during operation of the latching apparatus 128. Therefore, the first compression spring 140 may freely translate within the cylinder 130 and not impart any torque on the piston 136. The circumferential wall 138 of the piston 136 defines a contiguous cam-groove 146 thereon. The cam-groove 146 includes alternating upper and lower nodal points 148, 150 with upright and inclined segments 152, 154 therebetween.

As best shown in FIGS. 2-4, the latching apparatus 128 further includes a spring loaded plunger 156 disposed within the second opening 134 to slidably engage the cam-groove 146. The latching apparatus 128 further includes a cylindrical shell 158 disposed laterally to the cylinder 130. The cylindrical shell 158 is axially aligned with the second opening 134 to slidably receive the plunger 156 therein. The latching apparatus 128 further includes a second compression spring 160 disposed between a head end 162 of the cylindrical shell 158 and a stopper element 164 of the plunger 156 to bias the plunger 156 towards the cam-groove 146.

The latching apparatus 128 further includes a shank 166 extending from the piston 136. The shank 166 defines a transverse latch pin 168 at an end 170 thereof. The plunger 156 and the cam-groove 146 are configured to co-operatively execute one or more of translation and rotation of the shank 166 such that the latch pin 168 rotatably extends or retracts into and out of the slotted opening 126 on the locking plate 122 of the base portion 110. The latch pin 168 is configured to contact the depressor plate 124 and bias the piston 136 towards the head end 142 of the cylinder 130. Therefore, the latch pin 168 of the latching apparatus 128 may be forced against the depressor plate 124 by the compressed first compression spring 140.

Movement of the plunger 156 in the upright segment 152 of the cam-groove 146 urges the piston 136 to execute translation within the cylinder 130. Movement of the plunger 156 in the inclined segment 154 of the cam-groove 146 urges the piston 136 to execute simultaneous translation and rotation within the cylinder 130 such that the shank 166 and latch pin 168 rotate by a pre-determined angle 172 (FIG. 3).

Alternate upper nodal points 148 of the cam groove 146 correspond to one of a latching and unlatching configuration of the latch pin 168 with the slotted opening 126 such that latching and unlatching of the head and base portions 108, 110 is sequentially accomplished upon consecutive compressions of the first compression spring 140 by the latch pin 168 at the depressor plate 124. A pitch 174 (FIG. 5) between adjacent upper nodal points 148 of the cam-groove 146 is based on the pre-determined angle 172 (FIG. 3) of rotation to the latch pin 168 such that the latch pin 168 is configured to latch or unlatch from the locking plate 122. The pitch 174 between adjacent upper nodal points 148 corresponds to a 90 degree rotation of the latch pin 168 such that the latch pin 168 is one of either perpendicular or parallel to the slotted opening 126 and may hence, dispose the latch pin 168 such that the latch pin 168 is configured to latch (FIG. 12) onto or unlatch (FIG. 6) from the locking plate 122.

Figure 5:
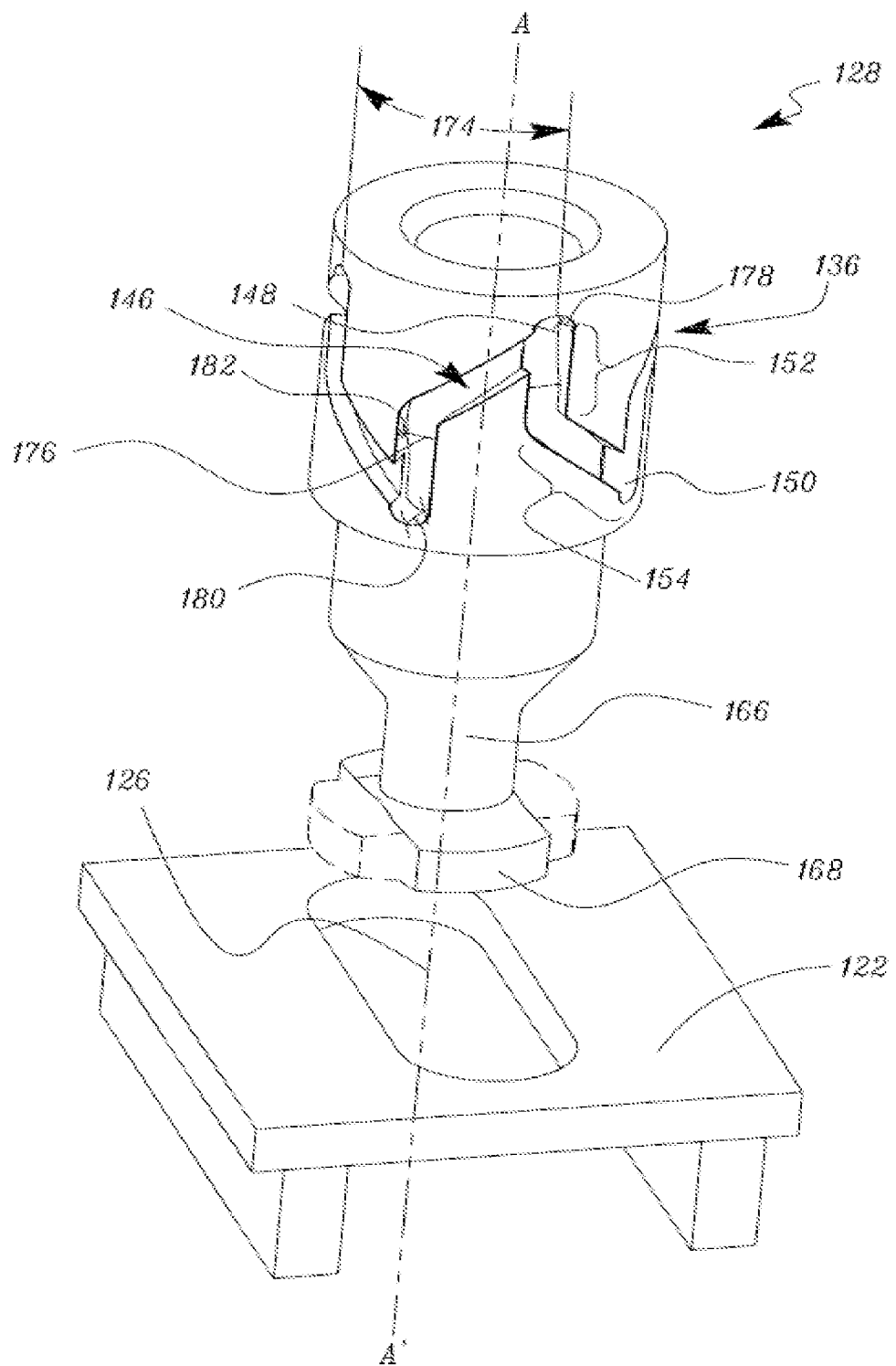
FIG. 5 is a front perspective view of a piston of the latching apparatus of FIG. 2 with surrounding elements removed to illustrate a circumferential wall of the piston, and a cam groove thereon.

Referring to FIG. 5, the cam-groove 146 will now be further described. The cam groove 146 defines a mid-point 176 at an intersection of the upright and inclined segments 152, 154, respectively. At the upper and lower nodal points 148, 150 the depths 178, 180 of the cam-groove 146 are greater than the depth 182 of the cam-groove 146 at the mid-point 176. The relatively greater depths 178, 180 of cam-groove 146 at the upper and lower nodal points 148, 150 as compared to the depth 182 at the mid-point 176 may impart the plunger 156 with a tendency to slide and slip into the upper or lower nodal points 148, 150. Therefore, the increased depths 178, 180 at the upper and lower nodal points 148, 150 bias the plunger 156 into sliding towards the upper and lower nodal points 148, 150 and allow a firm seating of the plunger 156 therein.

Further, when sliding the plunger 156 from an upper or lower nodal point 148, 150 to a successive mid-point 176, the plunger 156 may encounter a slight onward gradient in the cam-groove 146 caused by the progressively reducing depth of the cam-groove 146 from the upper or lower nodal point 148, 150 to the mid-point 176. This gradient serves to resist inadvertent translational and/or rotational movement of the piston 136 within the cylinder 130 by slidably biasing the plunger 156 towards the trailing upper or lower nodal point 148, 150. Furthermore, the relative depths 178, 180, and 182 of the cam-groove 146 at the upper nodal points 148, the lower nodal points 150, and the mid-points 176 are selected such that the plunger 156 slides in a single direction along the cam-groove 146. Hence, the plunger 156 co-operates with the cam-groove 146 to accomplish a unidirectional rotation, for example, a clockwise rotation of the piston 136 relative to the cylinder 130.

Referring again to FIG. 5, the coordination of the latch pin 168 to extendably lock within the locking plate 122 will be described. The shape of the latch pin 168 and a shape of the slotted opening 126 may be selected such that upon rotation of the latch pin 168 in pre-defined incremental values, the latch pin 168 sequentially takes a first and a second position whereby the latch pin 168 is extendable or retractable into and out of the slotted opening 126 in the first position, while the latch pin 168 is restricted from being drawn out of the slotted opening 126 in a second position. Therefore, the first and second position disclosed herein alternate with each other to accomplish a latching and unlatching of the latch pin 168 with the locking plate 122 sequentially.

Rotation of the latch pin 168 into the first position (shown in FIG. 5 in solid line) may dispose the latch pin 168 parallel to the slotted opening 126 and allow the latch pin 168 to pass into and out of the slotted opening 126 while rotation of the latch pin 168 into the second position (the latch pin 168 shown in broken line) may dispose the latch pin 168 perpendicular to the slotted opening 126 thus preventing the latch pin 168 from being drawn out of the slotted opening 126 when the shank 166 is extended. Thus, once the latch pin 168 is positioned beneath the locking plate 122 and has rotated out of the first position and into the second position, the latch pin 168 may lock under the locking plate 122 and hence, latch the latching apparatus 128 onto the locking plate 122.

Although explanation has been made with reference to the substantially rectangular latch pin 168 and slotted opening 126, it is to be noted that the substantially rectangular shape is merely exemplary and hence, non-limiting of this disclosure. Any shape commonly known in the art, such as a pentagonal shape, hexagonal shape and the like may be used to form the latch pin 168 and the corresponding slotted opening 126 such that the slotted opening 126 receives the latch pin 168 in one position, say for example, the first position, but restricts an entry of the latch pin 168 in another position, for example, the second position.

FIGS. 6-15 illustrate different operational states of the latching apparatus 128 in sequentially latching and unlatching the head portion 108 and the base portion 110 of the grabber 104. For the purposes of clarity in understanding the present disclosure, vertical arrows, upwards or downwards, illustrated alongside the piston 136 indicate a direction of travel of the piston 136 within the cylinder 130, while circled arrows shown around the shank 166 indicate a rotation of the piston 136, the shank 166 and the latch pin 168 in each operational state. Further, forcing of the latch pin 168 against the depressor plate 124 and subsequent compression of the first compression spring 140 is accomplished by an axial relative movement of the head portion 108 and the base portion 110 of the grabber 104.

Figure 6:
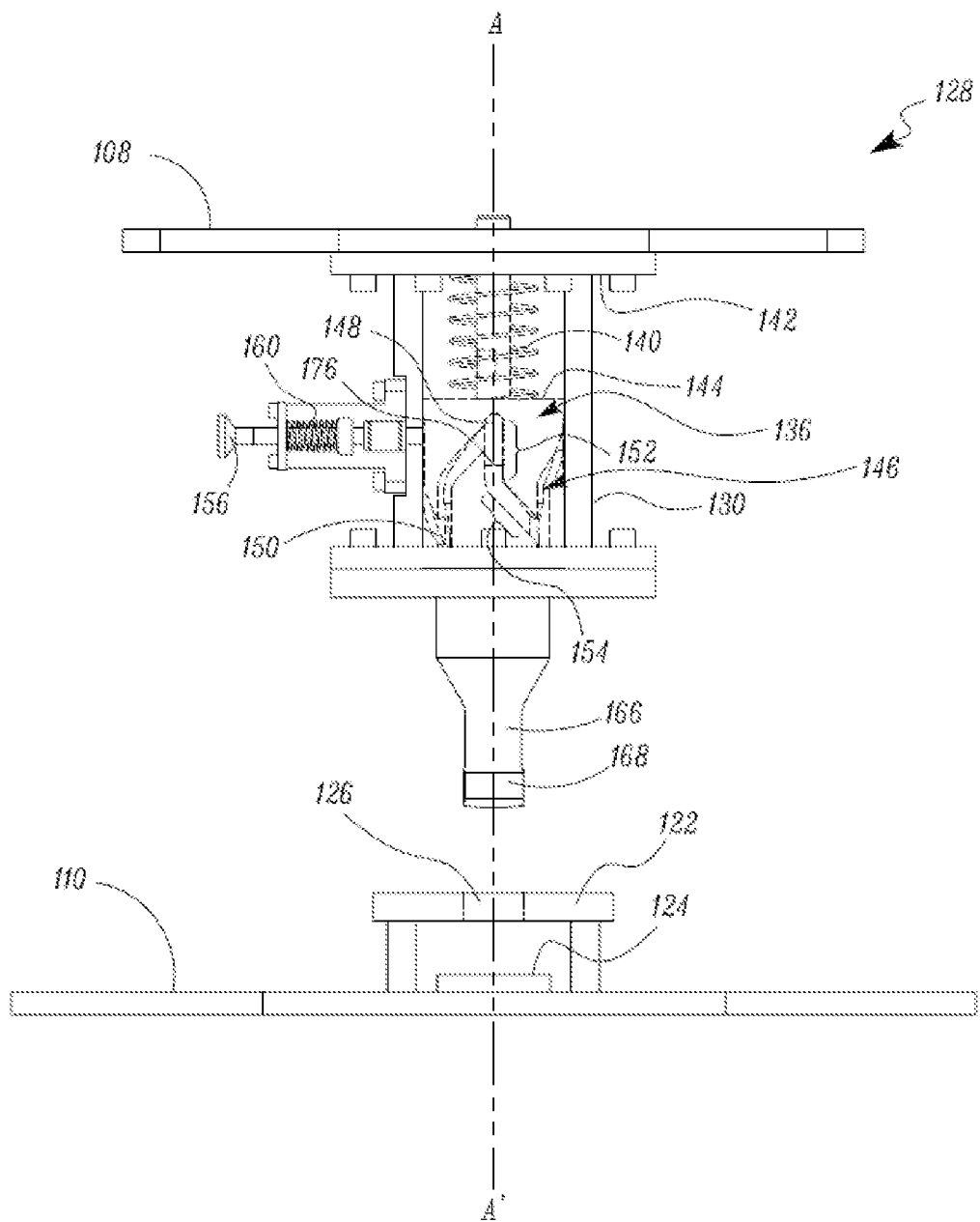
FIGS. 6-15 are front orthogonal views showing different operational states of the latching apparatus of FIG. 2.

Referring to FIG. 6, the latching apparatus 128 is suspended at a height from the head portion 108 of the grabber 104 thus disposing the latch pin 168 axially raised from the locking plate 122 and the slotted opening 126 thereon. In this operational state, the plunger 156 rests at the upper nodal point 148 of the cam-groove 146 while the latch pin 168 is disposed parallel to the slotted opening 126. Thus, the latch pin 168 may be assumed to have completed 0 degrees of rotation prior to initiating the latching operation.

Figure 7:
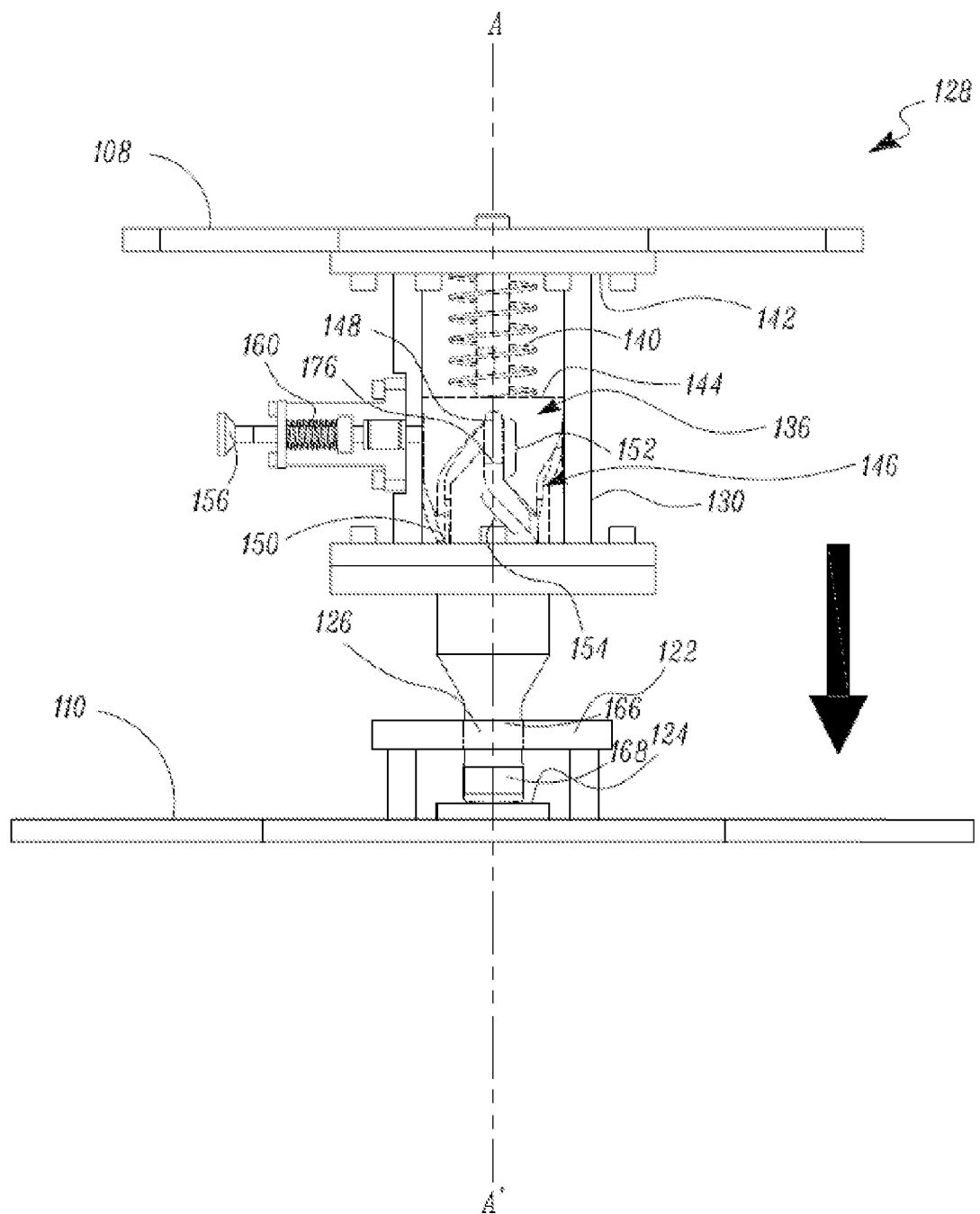

Referring to FIG. 7, latching operation is initiated wherein the head portion 108 and the base portion 110 are axially displaced and brought mutually closer to each other such that the latch pin 168 of the latching apparatus 128 is passed through the slotted opening 126 and brought in contact with the depressor plate 124. In this operational state, the plunger 156 continues to rest at the upper nodal point 148 of the cam-groove 146.

Figure 8:
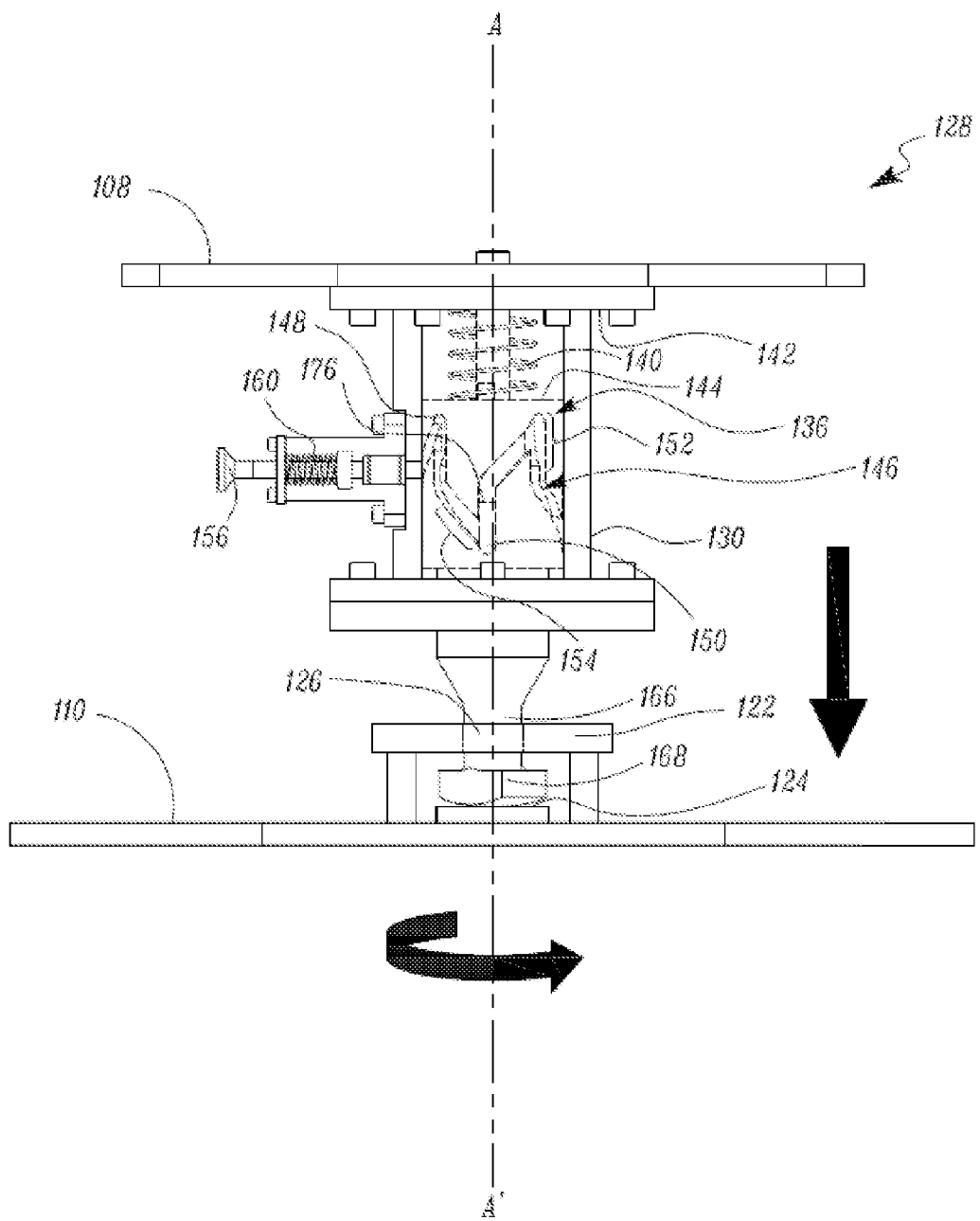

Referring to FIG. 8, the head and base portions 108, 110 of the grabber 104 are brought closer to each other to force the latch pin 168 against the depressor plate 124. Forcing the latch pin 168 against the depressor plate 124 biases the piston 136 towards the head end 142 of the cylinder 130 and compresses the first compression spring 140. Simultaneously, the plunger 156 slides from the upper nodal point 148 to the mid-point 176 on the cam-groove 146. Thus, the plunger 156 slides within the inclined segment 154 of the cam-groove 146 to co-operatively translate and rotate the piston 136, the shank 166, and the latch pin 168 by the pre-determined angle 172 in the clockwise direction. In the exemplary embodiment of FIG. 8, the latch pin 168 is rotated by 45 degrees about an axis A-A' through the centreline of the piston 136.

Figure 9:
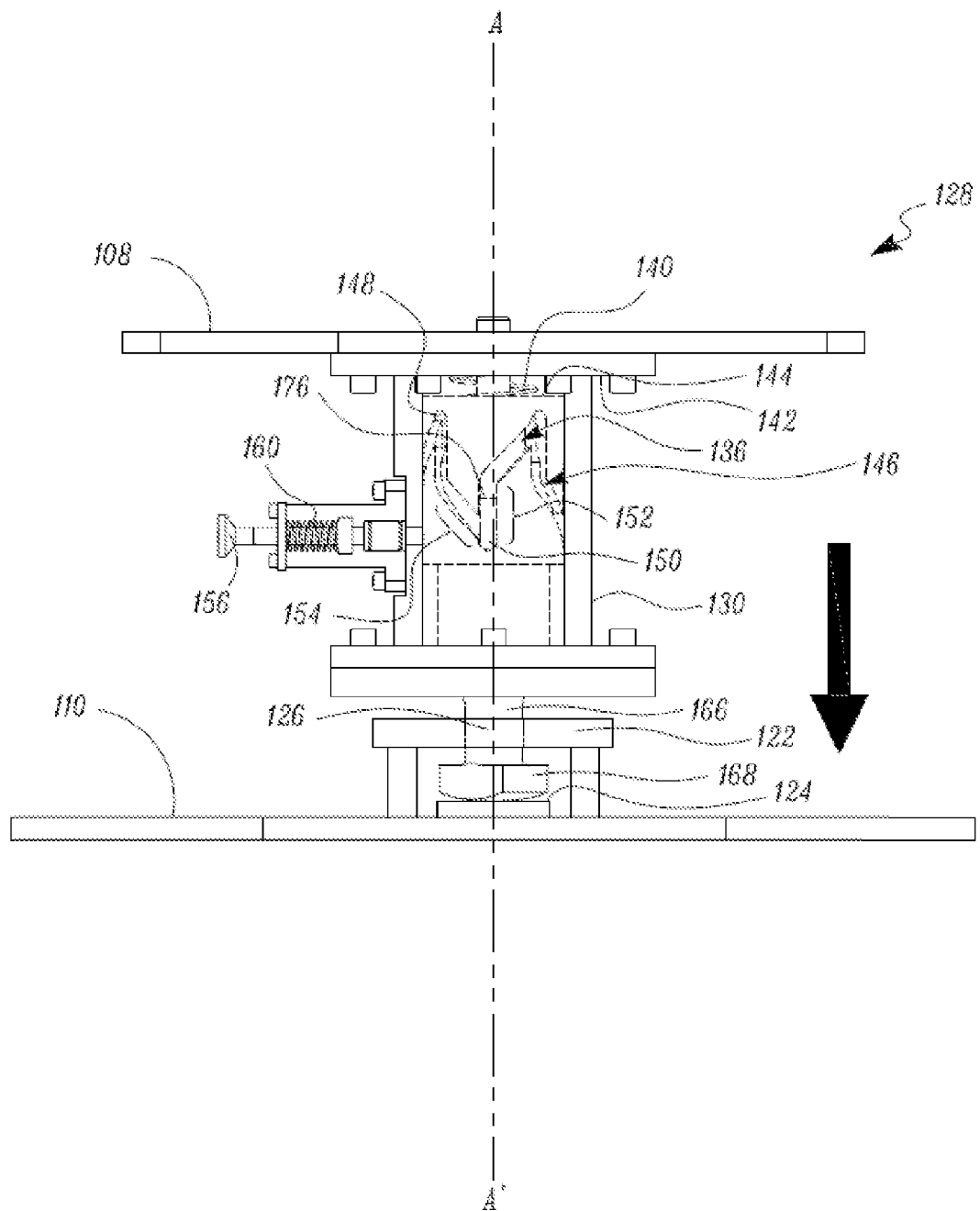

Referring to FIG. 9, the head and base portions 108, 110 of the grabber 104 are continually brought closer to each other until the head of the piston 136 is substantially close to the head of the cylinder 130. The force of the latch pin 168 against the depressor plate 124 continually increases and compresses the first compression spring 140. The plunger 156 slides on the upright segment 152 between the mid-point 176 and the lower nodal point 150 of the cam-groove 146 until the plunger 156 reaches the lower nodal point 150. As a result, the piston 136, the shank 166, and the latch pin 168 execute translatory movement within the cylinder 130 and remain at the 45-degree rotational position disclosed in FIG. 8.

Figure 10:
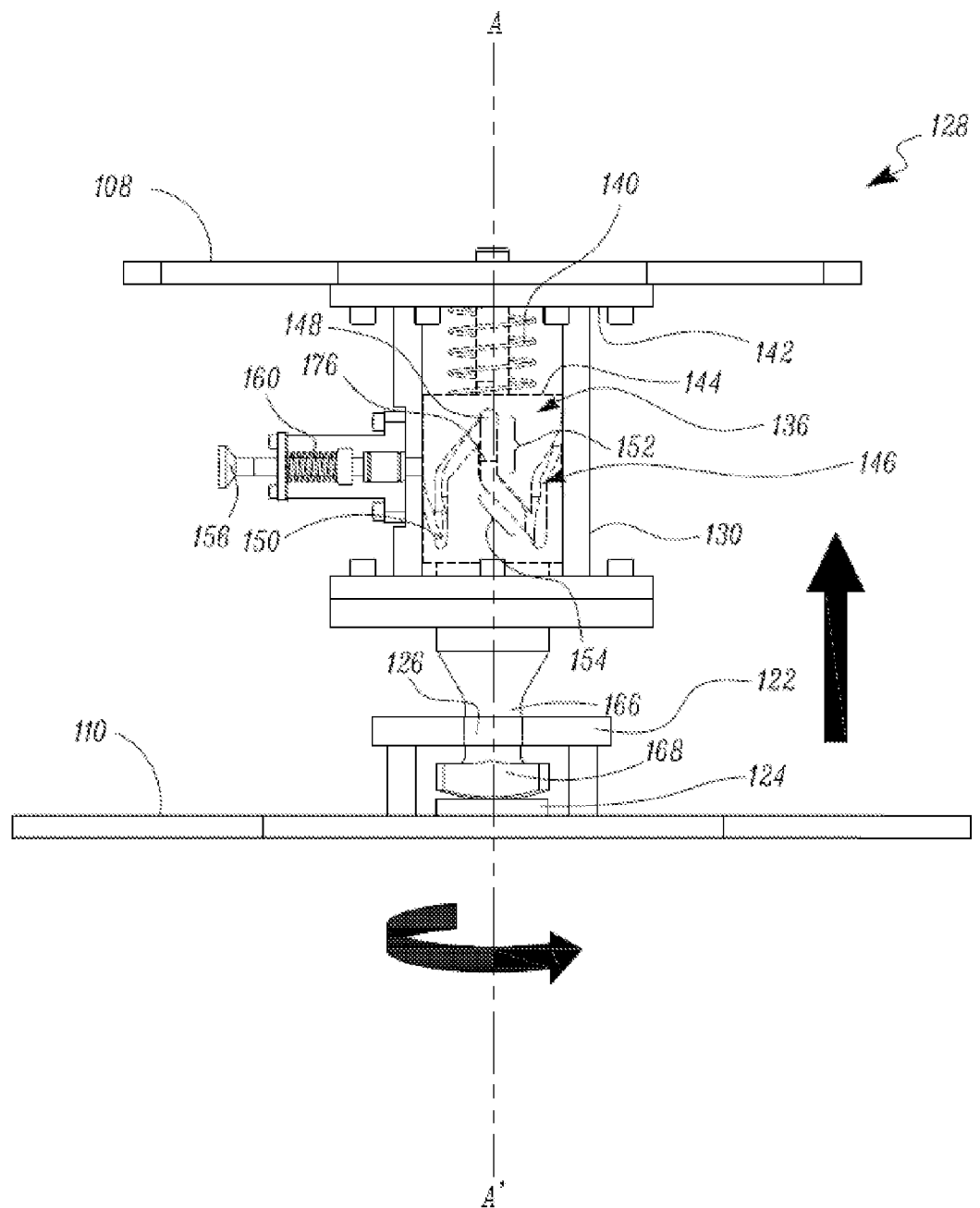

Referring to FIG. 10, the head and base portions 108, 110 of the grabber 104 are freed from mutual compression thus moving away from each other under a force of the compressed first compression spring 140. The force of the latch pin 168 against the depressor plate 124 is reduced corresponding to a less compressed spring 140 and a smaller biasing force on the piston 136. Simultaneously, the plunger 156 slides from the lower nodal point 150 to the mid-point 176 on the cam-groove 146. Thus, the plunger 156 slides within the inclined segment 154 of the cam-groove 146 to co-operatively translate and rotate the piston 136, the shank 166, and the latch pin 168 by the pre-determined angle 172 in the clockwise direction. In an exemplary embodiment, the latch pin 168 may be rotated by another 45 degrees about the axis A-A' thus rotatively positioning the latch pin 168 at a total of 90-degree from the initial position disclosed in FIG. 6. At this point, the latch pin 168 is disposed perpendicularly to the slotted opening 126.

Figure 11:
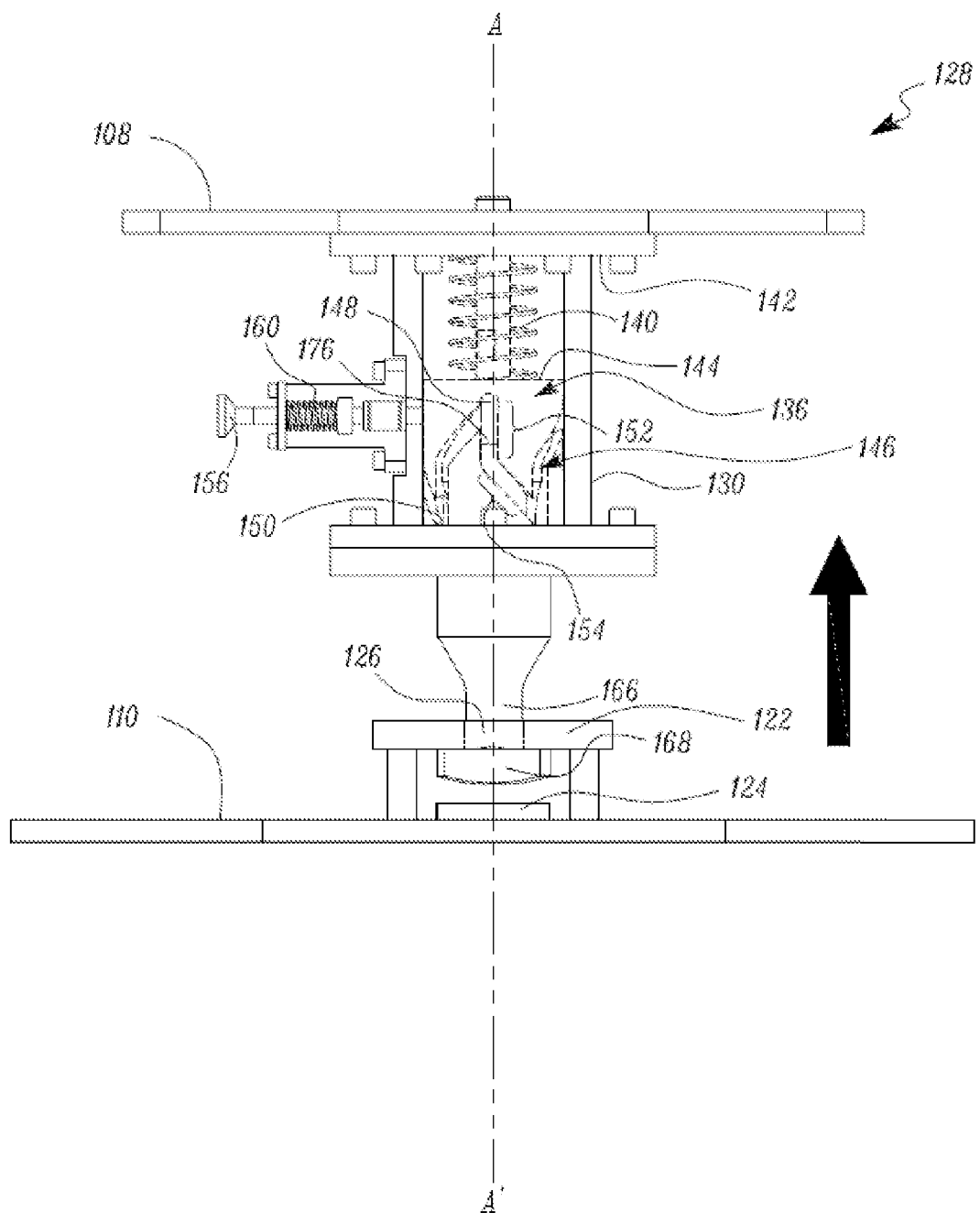

Referring to FIG. 11, the head and base portions 108, 110 of the grabber 104 are freed further from mutual compression thus moving farther away from each other under the force of the compressed first compression spring 140. Therefore, the first compression spring 140 may expand to bias the piston 136 away from the head end 142 of the cylinder 130. Consequently, the latch pin 168 may rise above the depressor plate 124 to contact with the locking plate 122. Simultaneously, the plunger 156 slides from the mid-point 176 to the upper nodal point 148 on the cam-groove 146. Thus, the plunger 156 slides on the upright segment 152 between the mid-point 176 and the upper nodal point 148 of the cam-groove 146 until the plunger 156 reaches the upper nodal point 148. As a result, the piston 136, the shank 166, and the latch pin 168 execute translatory movement within the cylinder 130 and remain at the 90-degree rotational position disclosed in FIG. 10.

At this point, the head portion 108 of the grabber 104 is considered to be latched to the base portion 110 after which the head portion 108 of the grabber 104 may be hoisted by the hoisting device 106 to collapse the arms 112 of the grabber 104. These collapsed arms 112 grab the object 102 and thereafter releasably maintained in their steady closed state by the plunger 156 at the upper nodal point 148 of the cam-groove 146. Thus, the coupler assembly 100 may be hoisted to securely transport the object 102. At the end of transporting the object 102 to a new location, the arms 112 may be spread away from the object 102. A process to spread the arms 112 of the grabber 104 away from the object 102 is disclosed below.

Further, the arms 112 once spread are releasably maintained in their steady spread state to allow the object 102 to be released therefrom.

Figure 12:
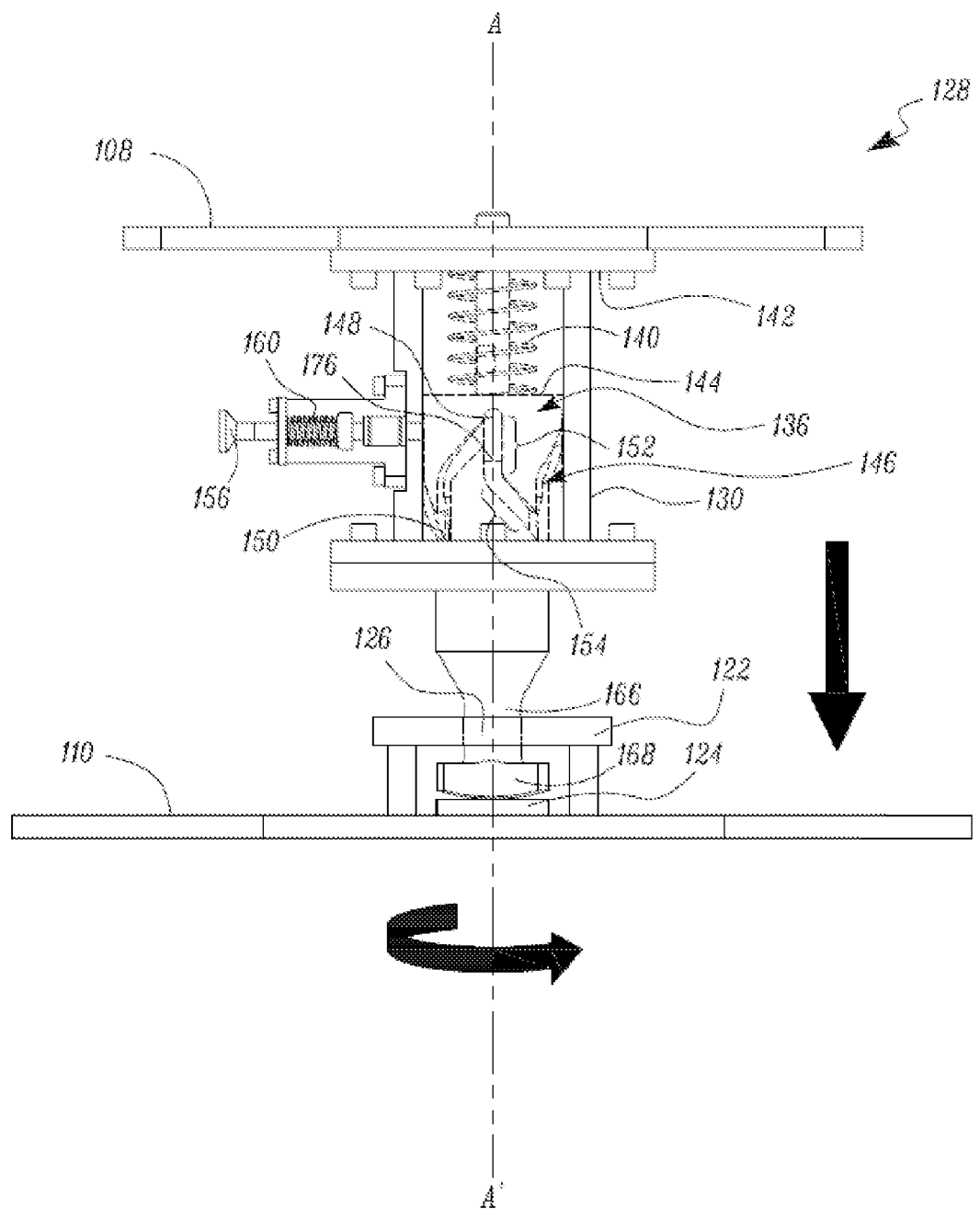

Referring to FIG. 12, the head portion 108 and the base portion 110 are axially displaced and brought mutually closer towards each other such that the latch pin 168 loses contact with the locking plate 122 and contacts the depressor plate 124. In this operational state, the plunger 156 continues to rest at the upper nodal point 148 of the cam-groove 146.

Figure 13:
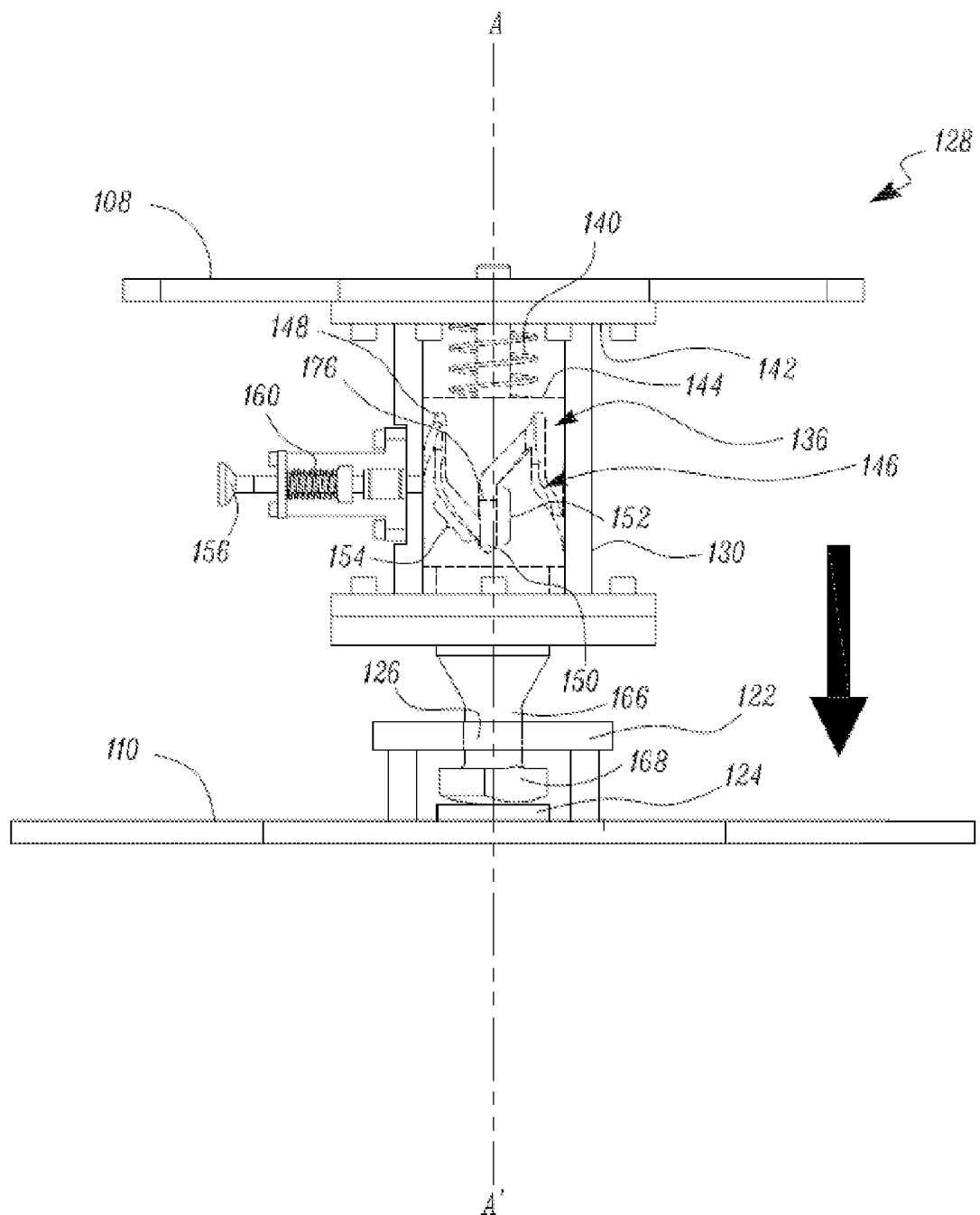

Referring to FIG. 13, the head and base portions 108, 110 of the grabber 104 are continually brought closer to each other until the head of the piston 136 is substantially close to the head of the cylinder 130. Therefore, the latch pin 168 may be forced against the depressor plate 124 to bias the piston 136 towards the head end 142 of the cylinder 130, and to compress the first compression spring 140. Consequently, the plunger 156 slides from the upper nodal point 148 to the mid-point 176 on the cam-groove 146. Thus, the plunger 156 slides within the inclined segment 154 of the cam-groove 146 to co-operatively translate and rotate the piston 136, the shank 166, and the latch pin 168 by the pre-determined angle 172 in the clockwise direction. In the exemplary embodiment of FIG. 13, the latch pin 168 may be rotated by 45 degrees about the centric axis A-A' thus rotatively positioning the latch pin 168 at a total of 135-degree from the initial position disclosed in FIG. 6.

Figure 14:
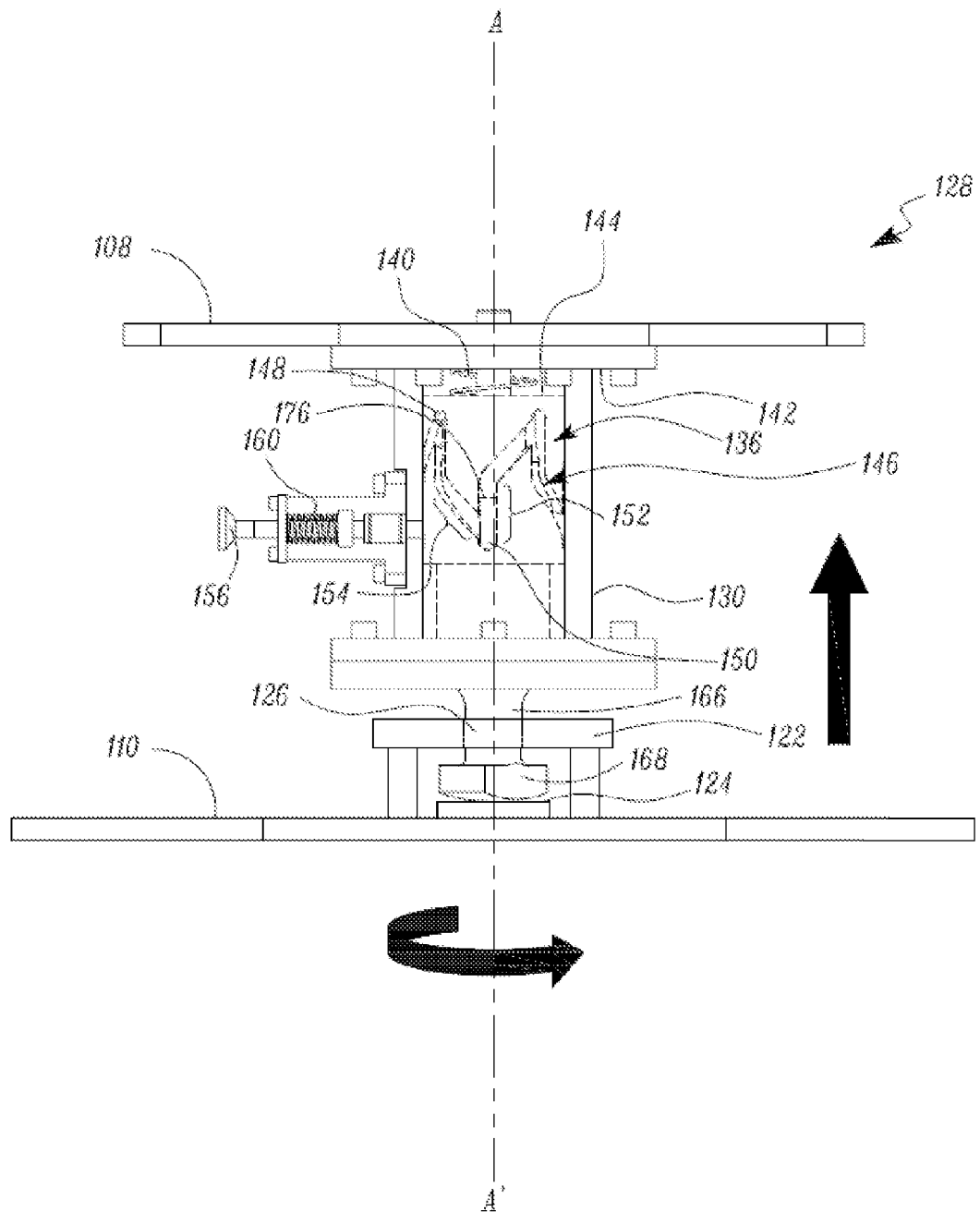

Referring to FIG. 14, the head and base portions 108, 110 of the grabber 104 are continually brought closer to each other until the head of the piston 136 is substantially close to the head of the cylinder 130. Therefore, the force of the latch pin 168 against the depressor plate 124 may continually increase to compress the first compression spring 140. Therefore, the plunger 156 slides on the upright segment 152 between the mid-point 176 and the lower nodal point 150 of the cam-groove 146 until the plunger 156 reaches the lower nodal point 150. As a result, the piston 136, the shank 166, and the latch pin 168 execute translatory movement within the cylinder 130 and remain at the 135-degree rotational position disclosed in FIG. 13.

Figure 15:
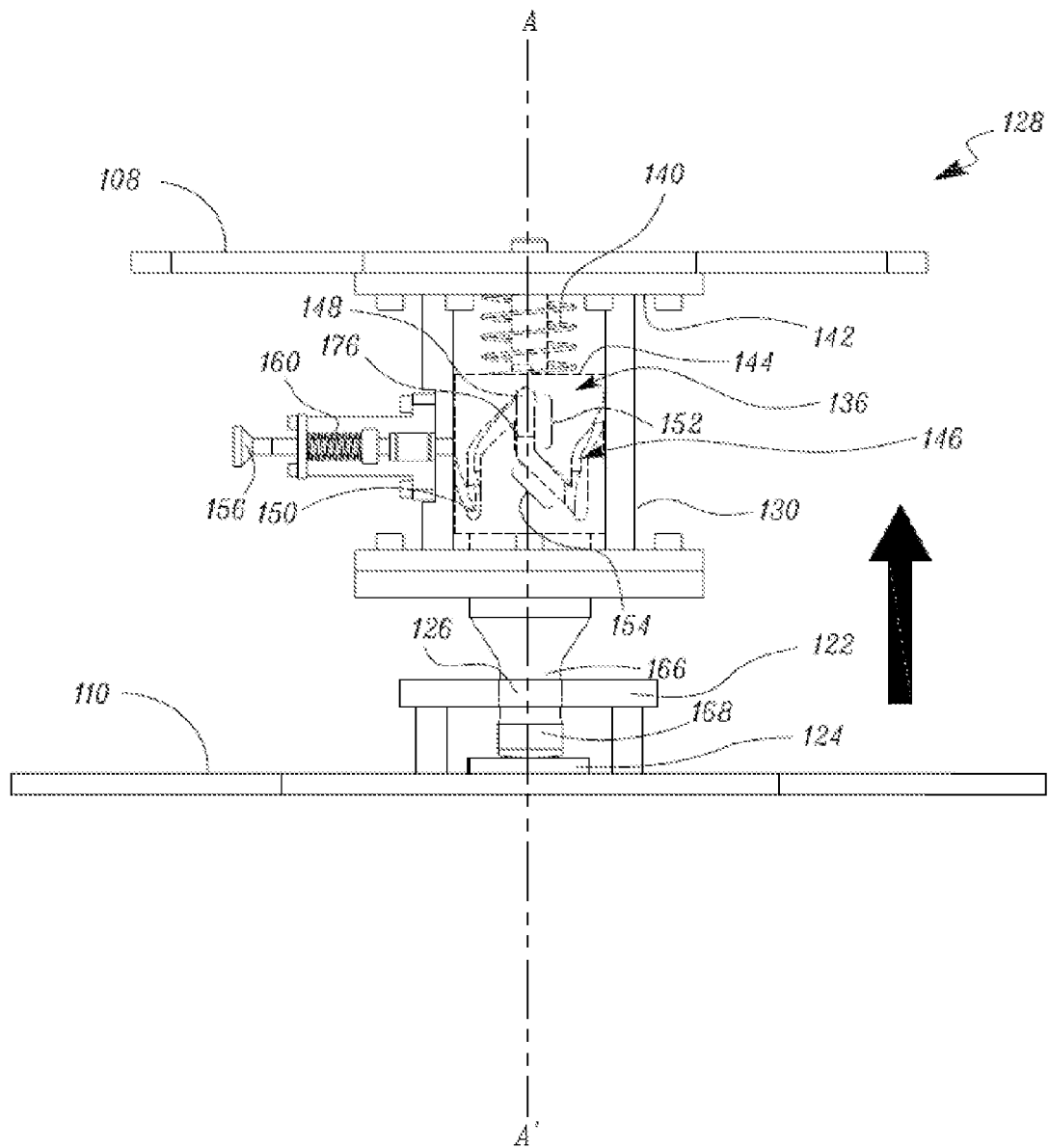

Referring to FIG. 15, the head and base portions 108, 110 of the grabber 104 are freed from mutual compression thus moving away from each other under a force of the compressed first compression spring 140. Therefore, the force of the latch pin 168 against the depressor plate 124 may reduce to bias the piston 136 away from the head end 142 of the cylinder 130. Simultaneously, the plunger 156 slides from the lower nodal point 150 to the mid-point 176 on the cam-groove 146. Thus, the plunger 156 slides within the inclined segment 154 of the cam-groove 146 to co-operatively translate and rotate the piston 136, the shank 166, and the latch pin 168 by the pre-determined angle 172 in the clockwise direction. In the exemplary embodiment of FIG. 15, the latch pin 168 may be rotated by another 45 degrees about the centric axis A-A' thus rotatively positioning the latch pin 168 at a total of 180-degree from the initial position disclosed in FIG. 6. At this point, the latch pin 168 is disposed parallel to the slotted opening 126. Further, at this point, the latch pin 168 may be retracted or pulled out of the slotted opening 126 and hence, unlatched from the locking plate 122. In this manner, the latch pin 168 may unlatch from the locking plate 122 to releasably maintain the arms 112 of the grabber 104 in the steady spread state. The steady spread state of the arms 112 releases the object 102 from the grabber 104.

INDUSTRIAL APPLICABILITY

Many large industrial manufacturers use grabbers to hoist and transport an object of manufacture from one location to another. Typically, these scenarios may be encountered in a shop floor having assembly lines. Previously known grabbers required operating personnel to adjust the arms of the grabbers such that the arms surrounded the object prior to hoisting the object. Further, in order to release and position the object at a required location, the arms of the grabber would have to be spread wide open by the operating personnel. Therefore, the activity of adjusting arms of the grabber may be repetitive each time the grabber is used in hoisting and transporting objects to a new location.

Repetitive adjustment to the arms for sequentially grabbing and releasing the object entails manual effort and hence, is labor intensive. Thus, mechanisms for sequentially adjusting and maintaining the arms between the grabbing and releasing positions may be required so that human intervention is reduced while operating the grabbers for hoisting and transporting the objects from one location to another.

With the latching apparatus 128 disclosed herein, the cam-groove 146 on the wall 138 of the piston 136 allows unidirectional rotation of the piston 136 to sequentially accomplish latching and unlatching of the head and base portions 108, 110 of the grabber 104 and releasably maintain the steady spread state or steady closed state of the arms 112 thereof. Upon implementation of the latching apparatus 128 with the grabber 104, the coupler assembly 100 thus formed integrally may do away with making repeated adjustments to the arms 112. Further, the latching apparatus 128 is actuated by an axial relative movement of the head portion 108 and the base portion 110 of the grabber 104 thus mitigating a need for any external actuation sources. Therefore, operator fatigue previously experienced in conventional grabbers is reduced with use of the latching apparatus 128 disclosed herein.

Further, with the latching apparatus 128 of the present disclosure, the arms 112 of the grabber 104 may be sequentially spread and closed as many times to release and grab the object 102. Furthermore, relative depths 178, 180, and 182 at the upper nodal point 148, lower nodal point 150, and the mid-point 176 in the cam-groove 146 of the piston 136 assist in holding the arms 112 of the grabber 104 in a specific state until an external force acts on it. Thus, on being spread apart or closed, the latching apparatus 128 releasably maintains a steady spread state or a steady closed state of the arms 112.

The latching apparatus 128 when employed with the grabber 104 also assists the grabber 104 in lifting relatively larger and heavier objects 102 since the latching apparatus 128 releasably maintains the arms 112 of the grabber 104 in the steady spread state or the steady closed state. Operators may use the coupler assembly 100 of the present disclosure to hoist and transport large or heavy objects 102 without the fear or risk of the object 102 releasing out of the grabber 104. Further, use of the latching apparatus 128 disclosed herein, may reduce time required in transportation of objects 102, and increase a performance of assembly lines in manufacturing sectors or any other industry sectors involving transportation of objects 102 such as logistics, freight services and the like.

Although the present disclosure discloses the latching apparatus 128 in conjunction with the grabber 104, it must be noted that the latching apparatus 128 can be used in other industrial areas such as, for example, in sequentially latching and unlatching a door to a frame and releasably maintaining the door in a latched and unlatched relation to the frame. Therefore, the latching apparatus 128 disclosed herein can be implemented in various other areas where sequential latching and unlatching is desired.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

We claim:

1. A latching apparatus for sequentially latching and unlatching two objects with at least one of the objects including a locking plate and a slotted opening thereon, the latching apparatus comprising:
   a cylinder attached to the first object, the cylinder including a first opening, and a second opening laterally disposed to the first opening;
   a spring loaded piston including a circumferential wall disposed in the first opening, the wall defining a contiguous cam-groove thereon, the cam-groove including alternating upper and lower nodal points with upright and inclined segments therebetween;
   a shank axially extending from the piston and defining a transverse latch pin at an end thereof; and
   a spring loaded plunger disposed within the second opening to slidably engage the cam-groove, the plunger and the cam-groove configured to co-operatively execute one or more of translation and rotation of the shank such that the latch pin rotatably extends or retracts into and out of the slotted opening on the locking plate of the second object.

2. The latching apparatus of claim 1 further including a cylindrical shell disposed laterally to the cylinder, the cylindrical shell axially aligned with the second opening to slidably receive the plunger.

3. The latching apparatus of claim 2 further including:
   a first compression spring disposed between a head end of the cylinder and a head end of the piston to bias the piston away from the head end of the cylinder; and
   a second compression spring disposed between a head end of the cylindrical shell and a stopper element of the plunger to bias the plunger towards the cam-groove.

4. The latching apparatus of claim 1, wherein a movement of the plunger in the upright segment of the cam-groove configures the piston to execute translation within the cylinder.

5. The latching apparatus of claim 1, wherein a movement of the plunger in the inclined segment of the cam-groove configures the piston to execute simultaneous translation and rotation within the cylinder such that the shank and latch pin rotate by a pre-determined angle.

6. The latching apparatus of claim 5, wherein a pitch between adjacent upper nodal points is based on the pre-determined angle of rotation of the latch pin such that the latch pin is configured to latch or unlatch from the locking plate.

7. The latching apparatus of claim 6, wherein the pitch between adjacent upper nodal points corresponds to a 90 degree rotation of the latch pin such that the latch pin is one of perpendicular and parallel to the slotted opening.

8. The latching apparatus of claim 1, wherein alternate upper nodal points correspond to one of a latching and unlatching configuration of the latch pin with the slotted opening such that latching and unlatching of the two objects is sequentially accomplished upon consecutive compressions of the first compression spring.

9. The latching apparatus of claim 1, wherein the cam-groove further defines a mid-point at an intersection of the upright and the inclined segments, wherein a depth of the cam-groove at the upper and lower nodal points is greater than a depth of the cam-groove at the mid-point.

10. A coupler assembly for sequentially coupling and uncoupling an object to a hoisting device, the coupler comprising:
   a grabber disposed between the hoisting device and the object, the grabber including:
      a head portion;
      two or more arms pivotally connected to the head portion; and
      a base portion including links configured to control a radial spread or closure of the arms relative to the object, the base portion including a locking plate defining a slotted opening thereon and a depressor plate spaced apart and disposed beneath the slotted opening; and
      a latching apparatus disposed between the head portion and the base portion to sequentially latch and unlatch the head portion to the base portion such that the arms are releasably maintained in a steady spread state or a steady closed state.

11. The coupler assembly of claim 10, wherein the latching apparatus includes:
   a cylinder attached to the head portion, the cylinder including a first opening, and a second opening laterally disposed to the first opening;
   a spring loaded piston including a circumferential wall disposed in the first opening, the wall defining a contiguous cam-groove thereon, the cam-groove including alternating upper and lower nodal points with upright and inclined segments therebetween;
   a shank axially extending from the piston and defining a transverse latch pin at an end thereof; and
   a spring loaded plunger disposed within the second opening to slidably engage the cam-groove, the plunger and the cam-groove configured to co-operatively execute one or more of translation and rotation of the shank such that the latch pin rotatably extends or retracts into and out of the slotted opening on the locking plate of the base portion.

12. The coupler assembly of claim 11 further including a cylindrical shell disposed laterally to the cylinder, the cylindrical shell axially aligned with the second opening to slidably receive the plunger.

13. The coupler assembly of claim 12 further including:
   a first compression spring disposed between a head end of the cylinder and a head end of the piston to bias the piston away from the head end of the cylinder; and
   a second compression spring disposed between a head end of the cylindrical shell and a stopper element of the plunger to bias the plunger towards the cam-groove.

14. The coupler assembly of claim 13, wherein the latch pin is configured to contact the depressor plate and bias the piston towards the head end of the cylinder.

15. The coupler assembly of claim 11, wherein a movement of the plunger in the upright segment of the cam-groove configures the piston to execute translation within the cylinder.

16. The coupler assembly of claim 11, wherein a movement of the plunger in the inclined segment of the cam-groove configures the piston to execute simultaneous translation and rotation within the cylinder such that the shank and latch pin rotate by a pre-determined angle.

17. The coupler assembly of claim 16, wherein a pitch between adjacent upper nodal points is based on the pre-determined angle of rotation to the latch pin such that the latch pin is configured to latch or unlatch from the locking plate.

18. The coupler assembly of claim 17, wherein the pitch between adjacent upper nodal points corresponds to a 90 degree rotation of the latch pin such that the latch pin is one of perpendicular and parallel to the slotted opening.

19. The coupler assembly of claim 11, wherein alternate upper nodal points correspond to one of a latching and unlatching configuration of the latch pin with the slotted opening such that latching and unlatching of the head and base portions is sequentially accomplished upon consecutive compressions of the first compression spring by the latch pin at the depressor plate.

20. The coupler assembly of claim 11, wherein the cam-groove further defines a mid-point at an intersection of the upright and the inclined segments, wherein a depth of the cam-groove at the upper and lower nodal points is greater than a depth of the cam-groove at the mid-point.

\* \* \* \* \*